United States Patent [19]

Hori et al.

[11] Patent Number: 4,481,425
[45] Date of Patent: Nov. 6, 1984

[54] AUTOMATIC CONTROL SYSTEM FOR PRIME MOVERS

[75] Inventors: Shinichi Hori, Anjo; Yasuichi Ohnishi; Makoto Ono, both of Kariya, all of Japan

[73] Assignee: Nippondenso Co., Ltd., Kariya, Japan

[21] Appl. No.: 399,957

[22] Filed: Jul. 19, 1982

[30] Foreign Application Priority Data

Jul. 22, 1981 [JP] Japan .................................. 56-114876

[51] Int. Cl.³ ...................... F02N 17/00; B60K 15/00; H02P 9/04; F02B 3/00

[52] U.S. Cl. .................................. 290/51; 290/30 R; 290/38 R; 290/DIG. 1; 290/DIG. 3; 123/179 B; 364/431.09

[58] Field of Search ................. 290/30 R, 30 A, 30 B, 290/34, 51, 1 E, 38 R, 37 R, 48, DIG. 1–DIG. 11; 123/179 B; 364/424, 431.04, 431.11, 431.1, 431.09

[56] References Cited

U.S. PATENT DOCUMENTS

| | | | |
|---|---|---|---|
| 3,731,108 | 5/1973 | Kobara et al. | 290/38 |
| 3,872,316 | 3/1975 | Kurii et al. | 123/179 B X |
| 3,949,236 | 5/1976 | Kurii et al. | 290/38 R |
| 4,286,683 | 9/1981 | Zeigner et al. | 123/179 B X |
| 4,364,343 | 12/1982 | Malik | 123/179 B |
| 4,377,137 | 3/1983 | Amano et al. | 123/179 B |
| 4,397,281 | 8/1983 | Nakano et al. | 123/179 B X |
| 4,402,286 | 9/1983 | Pagel et al. | 123/179 B |

Primary Examiner—B. Dobeck
Assistant Examiner—Terry Flower
Attorney, Agent, or Firm—Cushman, Darby & Cushman

[57] ABSTRACT

An automatic control system for such a prime mover as a vehicle engine is adapted to automatically stop the prime mover when such a driven device as a vehicle is arrested, to automatically drive the prime mover in response to operation of a starting mechanism for effecting start of the driven device, and to maintain the prime mover in its operative condition when the driven device is moving. The control system is arranged to be inoperative in an expected occurrence of an error in operation of a setting switch for the system and to indicate the operative condition of the system under normal control of the setting switch.

5 Claims, 4 Drawing Figures

AUTOMATIC CONTROL SYSTEM FOR PRIME MOVERS

BACKGROUND OF THE INVENTION

The present invention relates to an automatic control system for prime movers such as an internal combustion engine for automatic vehicles, and more particularly to an automatic control system for prime movers for automatically effecting start of the prime mover in response to operation of a starting mechanism such as a clutch pedal and maintaining the prime mover in its operative condition when the vehicle is moving and for automatically effecting stop of the prime mover when the vehicle is arrested.

In such automatic control systems for prime movers as described above, a setting switch is arranged to be operated after the starter switch is actuated for making the control system operative. In use of the automatic control system, it is, however, presumable that if there occurs a malfunction of the setting switch and its related portion, the automatic start and stop control of the prime mover is effected in response operation of the starter switch without any intention of the operator. Under such a condition, the operator will be involved in unexpected stop and start of the prime mover in his driving operation, and it is impossible to render such automatic control of the prime mover ineffective without repair of the setting switch.

SUMMARY OF THE INVENTION

It is, therefore, the primary object of the present invention to provide an improved automatic control system for prime movers which is arranged to be maintained in its inoperative condition when the main switch for start of the prime mover is actuated after an unexpected occurrence of a malfunction of the setting switch and its related portion and to inform the operator that the control system is being operated by an error in operation of the setting switch after the main switch is actuated.

In the present invention, the primary object is accomplished by provision of an automatic control system for controlling the operation of such a prime mover as a vehicle engine having a starter control circuit in its activated condition for connecting an electric power source to a starter and in its deactivated condition for disconnecting the starter from the power source, a drive control circuit in its activated condition for maintaining the operative condition of the prime mover and in its deactivated condition for automatically rendering the prime mover inoperative, a main switch in its actuated position for connecting the power source to the drive control circuit, and a starting mechanism for effecting the start of such a driven device as a vehicle. The automatic control system comprises an electric control device for activating the starter control circuit in response to operation of the starting mechanism and for detecting the start of the prime mover caused by the starter to deactivate the starter control circuit and being arranged to maintain the drive control circuit in its activated condition while the driven device is moving and to deactivate the drive control circuit when motion of the driven device is arrested, and setting means arranged to be operated after the main switch is actuated for making the electric control device operative. The electric control device is arranged to detect presence of a malfunction of the setting means and its related portion when the main switch is actuated after the occurrence of the malfunction and to detect an error in operation of the setting means after the main switch is actuated and is further arranged to be maintained in its inoperative condition when detected the presence of the malfunction. The electric control device further includes signalling means responsive to the detection of the error to inform the operator that the electric control device is being operative.

In a preferred embodiment of the present invention, the electric control device is in the form of computer means programmed to ascertain the presence of an error in operation of the setting means so as to render the control of the starter and drive control circuits ineffective in the occurrence of the error and being programmed to set a condition for control of the starter and drive control circuits under normal operation of the setting means and to produce an output signal for activating the indication means after set of the condition for control of the starter and drive control circuits. It is preferable that the indication means is a setting lamp cooperable with the computer means to be lit in response to the output signal from the computer means for indicating the set condition for control of the starter and drive control circuits.

BRIEF DESCRIPTION OF THE DRAWINGS

Additional objects and advantages of the present invention will be more apparent from the following detailed description of the preferred embodiment thereof when taken together with the accompanying drawings in which.

DETAILED DESCRIPTION OF THE PREFERRED EMBODIMENT

Figure 1:
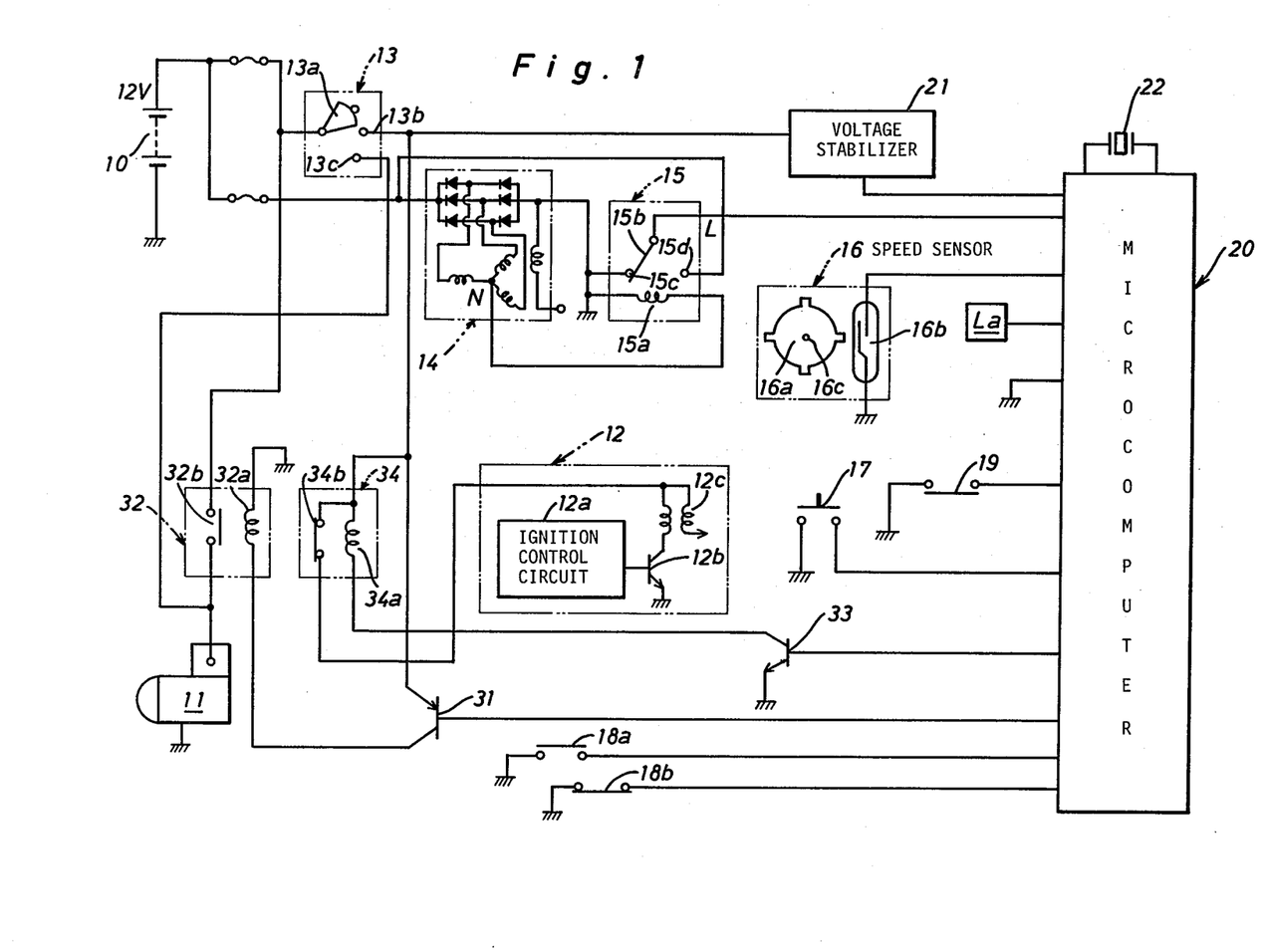
FIG. 1 is a block diagram of an automatic control system for a vehicle engine in accordance with the present invention.

Referring now to the drawings, particularly in FIG. 1, the reference numeral 11 designates a starter motor for an internal combustion engine, the reference numeral 12 designates an ignition circuit of the engine, and the reference character La designates a setting lamp. The starter motor 11 is connected to an electric DC power source 10 in the form of a vehicle battery through an ignition switch 13. When a movable contact 13a of switch 13 is temporarily connected to a fixed contact 13c, the starter motor 11 is operated by supply of an electric current from the power source 10 to effect cranking operation of the engine. The ignition circuit 12 includes a control circuit 12a and an ignition coil 12c connected to the control circuit 12a through a transistor 12b. The control circuit 12a is connected to a signal generator which is assembled within a distributor of the engine. The transistor 12b is energized in response to an electric signal from the signal generator under control of the control circuit 12a and is deenergized in response to disappearance of the electric signal from the signal generator. The ignition coil 12c is energized in response to energization of the transistor 12b and generates a spark voltage upon deenergization of the primary winding thereof caused by deenergization of the transistor 12b, the spark voltage being applied to the distributor of the engine. The setting lamp La is arranged to light under a condition for automatic start and stop control of the engine as described in detail later. The extinguishment of setting lamp La indicates the fact that the engine is released from its automatic start and stop control.

Connected between the power source 10 and a regulator relay 15 is an alternator 14 which is arranged to generate an AC voltage at a neutral point of the stator-coil thereof when driven by the engine and to convert it to a DC voltage to be applied to the power source 10. The regulator relay 15 includes an electromagnetic coil 15a and a movable contact 15b which is selectively connected to an earth terminal 15c and a fixed contact 15d. The electromagnetic coil 15a is connected at its opposite ends to the neutral point N of the stator-coil and the earth terminal 15c, and the fixed contact 15d is connected to the power source 10. During deenergization of the electromagnetic coil 15a, the movable contact 15b is connected to the earth terminal 15c to generate a low level voltage $L_o$ at its output terminal L. When the electromagnetic coil 15a is energized by an AC voltage appearing at the neutral point N of the stator-coil, the movable contact 15b is connected to the fixed contact 15d to generate a high level voltage at its output terminal L.

A microcomputer 20 is connected to the regulator relay 15, a speed sensor 16, the setting lamp La, a setting switch 17, first and second clutch switches 18a, 18b and a door switch 19. The speed sensor 16 includes a disk 16a of permanent magnet and a reed-switch assembly 16b in magnetic coupling with each projection of disk 16a. The disk 16a is fixed to a speedometer cable 16c which is arranged to be driven by an output shaft of a power transmission of the vehicle. When the disk 16a is rotated in driving operation of the speedometer cable 16c, the reed-switch 16b acts to magnetically detect each projection of the disk 16a so as to produce a series of speed pulses corresponding with the actual speed of the vehicle. The setting switch 17 is in the form of a normally open switch of the self-return type which is arranged at an appropriate place in the passenger compartment of the vehicle to produce a set signal of low level therefrom when temporarily closed. Both the clutch switches 18a and 18b are associated with a clutch pedal of the vehicle. The first clutch switch 18a is in the form of a normally open switch which is arranged to be closed by full depression of the clutch pedal to produce a first clutch signal therefrom, while the second clutch switch 18b is in the form of a normally closed switch which is arranged to be opened in response to depression of the clutch pedal to produce a second clutch signal therefrom. The second clutch signal disappears in response to release of the clutch pedal. The door switch 19 is in the form of a normally closed switch which is arranged in a vehicle door structure to be closed by opening of the vehicle door to produce a door signal therefrom. The door signal disappears in response to closing of the vehicle door.

The microcomputer 20 is arranged to be ready for its operation in response to the constant voltage (for instance, 5 volt) from a voltage stabilizer 21 when the ignition switch 13 is closed. The computer 20 comprises a central processing unit or CPU, an input-output device or I/O, a read only memory or ROM, a random access memory or RAM and a clock circuit which are connected to each other through a bus line. I/O receives the low or high level voltage $L_o$ or $H_i$ from regulator relay 15, speed pulses from sensor 16, a set signal from setting switch 17, clutch signals from first and second clutch switches 18a, 18b and a door signal from door switch 19 to apply them to RAM. The clock circuit cooperates with a crystal oscillator 22 to produce clock signals at a predetermined frequency. ROM is arranged to previously store a main control program and an interruption control program illustrated by each flow-chart in FIGS. 2 3 and 4, which programs are executed by the CPU in the computer 20 as described in detail later.

The CPU includes an interruption timer which acts to initiate measurement of a predetermined period of time, for instance 1 milli-second, in response to start of the computer 20 and is reset upon lapse of the period of time to resume the measurement of time. Thus, the CPU acts to execute the main control program in response to the clock signals from the clock circuit and ceases the execution of the main control program upon each lapse of the predetermined period of time to execute the interruption control program. During such alternative execution of the control programs, the computer 20 produces output signals necessary for lighting or extinguishing the setting lamp La, for activating or deactivating the starter motor 11 and for energizing or deenergizing the ignition coil 12c. In this instance, the execution of the main control program is repetitively carried out by the CPU within 10 milli-seconds after each execution of the program.

The computer 20 is further connected to a starter relay 32 and an ignition relay 34 respectively through transistors 31 and 33. The transistor 31 is connected at its base to the I/O of computer 20 and at its emitter to the fixed contact 13b of ignition switch 13 to be energized by receiving a drive signal from the CPU of the computer during closure of ignition switch 13 and to be deenergized in response to a stop signal from CPU of the computer. The transistor 33 is grounded at its emitter and connected at its base to the I/O of the computer 20 to be deenergized by receiving an activating signal from CPU of the computer and to be energized by receiving a deactivating signal from the CPU of the computer, as will be described in detail later. The starter relay 32 includes an electromagnetic coil 32a and a normally open contact 32b. The electromagnetic coil 32a is grounded at one end thereof and connected at its other end to the collector of transistor 31 to be energized by supply of an electric current from the power source 10 during energization of the transistor 31 and to be deenergized in response to deenergization of the transistor 31. The normally open contact 32b of relay 32 is interposed between the power source 10 and starter motor 11 to be closed in response to energization of coil 32a to connect the starter motor 11 with the power source 10. The normally open contact 32b returns to its open position in response to deenergization of coil 32a to disconnect the starter motor 11 from the power source 10.

The ignition relay 34 includes an electromagnetic coil 34a which is connected at its one end to the fixed contact 13b of ignition switch 13 and at its other end to the collector of transistor 33 to be deenergized during deenergization of transistor 33 and to be energized by supply of an electric current from the power source 10 in response to energization of transistor 33. The ignition relay 34 also includes a normally closed contact 34b which is maintained in its closed position during deenergization of coil 34a to permit supply of the electric current to the ignition coil 12c from the power source 10. When the electromagnetic coil 34a is energized, the normally closed contact 34b is opened to disconnect the ignition coil 12c from the power source 10.

Figure 2:
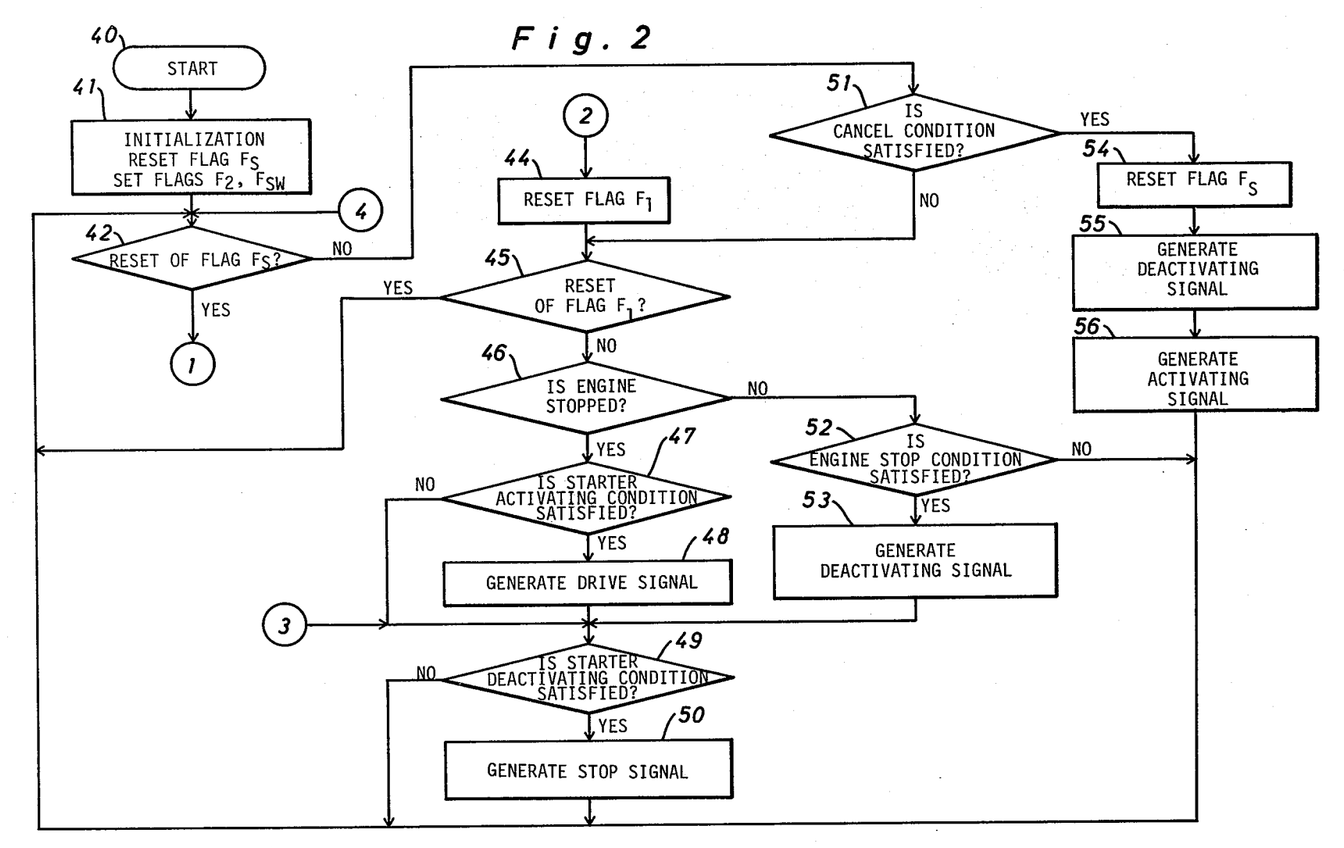
FIG. 2 is a flow-chart illustrating a main control program executed by the microcomputer of FIG. 1.

In operation, when the movable contact 13a of ignition switch 13 is connected to the fixed contact 13b when the vehicle is stopped, the computer 20 is conditioned in its operation by receiving the constant voltage from stabilizer 21 to operate the interruption timer of the CPU and to initiate the execution of the main control program at a step 40 of the flow-chart shown in FIG. 2. Subsequently, when the movable contact 13a of ignition switch 13 is temporarily connected to the fixed contact 13c, the starter motor 11 cooperates with the ignition circuit 12 to start the engine. Under such condition, the regulator relay 15 generates a high level voltage $H_l$ therefrom under control of the alternator 14, and the speed sensor 16 is still maintained in its deactivated condition when the vehicle is stopped.

When the main control program proceeds to a step 41 under the above condition, the CPU acts to initialize the computer 20, to reset a flag $F_s$, to reset a flag $F_{sw}$ and to set a flag $F_2$ the actual level of speed pulses from speed sensor 16. At this stage, the actual level of speed pulses is a low level because the reed-switch 16b of sensor 16 is closed by magnetic coupling with disk 16a. Successively, the main control program proceeds to a step 42 where CPU acts to discriminate whether the flag $F_s$ is reset or not. In this embodiment, the flag $F_s$ represents the fact that a setting condition for automatic start and stop control of the engine is satisfied, and the flag $F_{sw}$ is adapted to presume the setting switch 17 conditioned in its operative position at this stage. The setting condition for automatic start and stop control of the engine is satisfied by such three factors as generation of a high level voltage from regulator relay 15, disappearance of the door signal from door switch 19 and generation of a set signal from the setting switch 17. If the answer is determined to be "YES" at step 42, the CPU main control program proceeds to a routine for discrimination of the setting condition described above as illustrative by the reference numeral 43 in FIG. 3.

Figure 3:
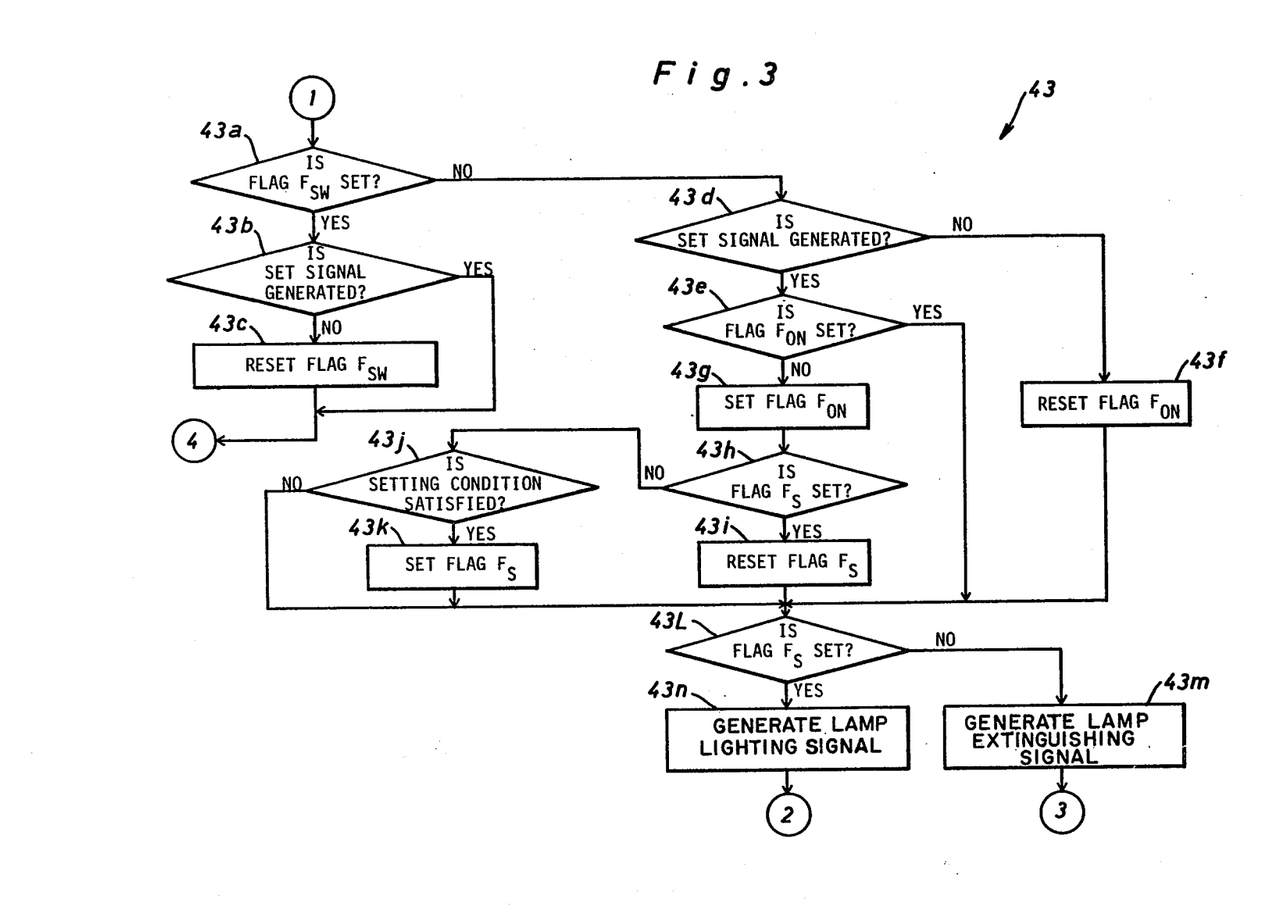
FIG. 3 is a flow-chart illustrating a discrimination routine for the main control program.
Figure 4:
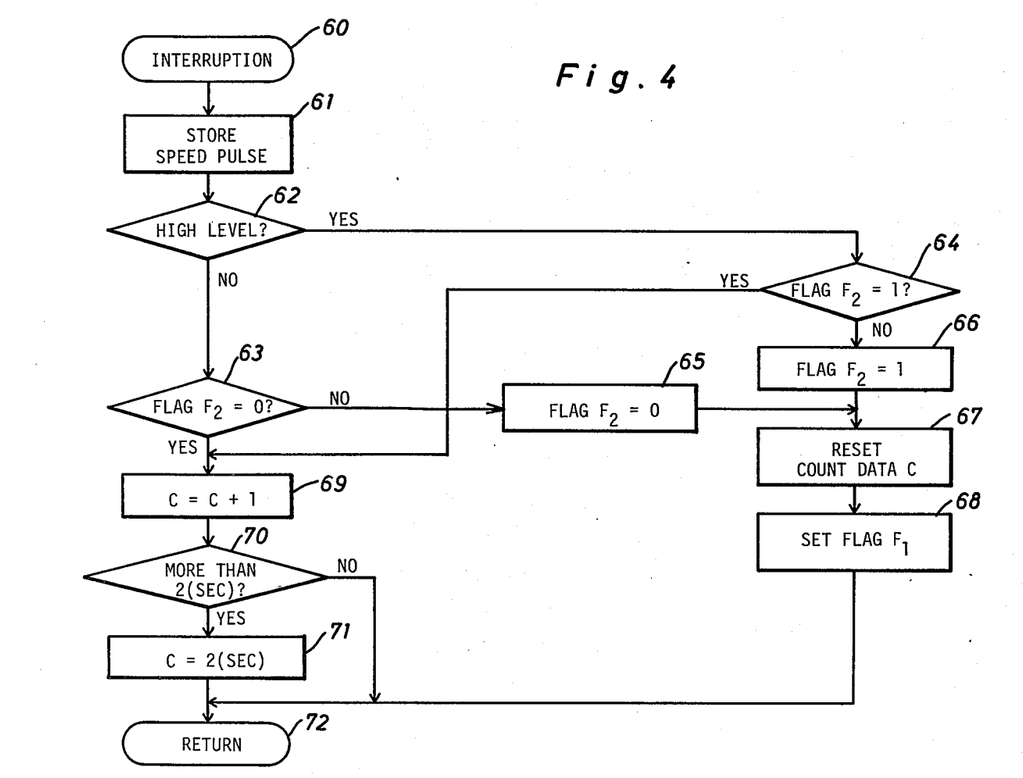
FIG. 4 is a flow-chart illustrating an interruption control program executed by the microcomputer.

When the main control program proceeds to a step 43a of the discrimination routine 43, the CPU determines whether the flag $F_{sw}$ is set or not. At this stage, the answer is determined to be "YES" because the flag $F_{sw}$ is previously set at the step 41, and then the main control program proceeds to a step 43b where the CPU determines the presence of the set signal from the setting switch 17. At this stage, the answer is determined to be "NO" because the setting switch 17 remains in its inoperative position, and then CPU acts at a step 43c to reset the flag $F_{sw}$ and to return the control program to the step 42. When the control program proceeds again to step 43a through step 42, the CPU determines a "YES" answer and proceeds to a step 43d to determine the presence of the set signal from setting 43d to determine the presence of the set signal from setting switch 17. Subsequently, the CPU determines a "NO" answer at step 43d because of disappearance of the set signal, and the program proceeds to a step 43f where the CPU acts to reset a flag $F_{ON}$. In this embodiment, the flag $F_{ON}$ is adapted to represent operation of the setting switch 17. When the program proceeds to a step 43L through step 43f, CPU determines a "NO" answer due to the reset flag $F_s$ at step 41 and proceeds to the following step 43m. At step 43m, the CPU produces an output signal for extinguishing the setting lamp La and maintaining it in its deactivated condition.

When the program proceeds to a step 49 of FIG. 2 through step 43m, the CPU determines whether or not a condition for deactivation of the starter 11 is satisfied. In this embodiment, the condition for deactivation of the starter 11 is arranged to be satisfied by generation of the high level voltage $H_l$ from regulator relay 15. At this stage, the CPU determines a "YES" answer at step 49 in response to generation of the high level voltage $H_l$ from regulator relay 15 caused by the start of the engine, and the program returns to step 42 through a step 50. During such execution of the main control program, the CPU stops the execution of the main control program upon each lapse of 1 millisecond so as to execute the interruption control program shown in FIG. 4.

Assuming that during the above execution of the main control program the door switch 19 is opened by opening of the vehicle door to generate a door signal therefrom and the setting switch 17 is temporarily closed to generate a set signal therefrom, the CPU determines a "YES" answer 43d and proceeds to a step 43e. At step 43e, the CPU determines whether the flag $F_{ON}$ is set or not. In this instance, the CPU determines a "NO" answer due to previous reset of the flag $F_{ON}$ at step 43f and successively acts to set the flag $F_{ON}$ at the following step 43g. When the program proceeds to a step 43h, the CPU determines a "NO" answer due to previous reset of the flag $F_s$ at step 41 and further discriminates at a step 43j whether or not the setting condition is satisfied. The answer to this question is determined to be "NO" due to generation of the door signal from switch 19, and the program proceeds to step 43L where the CPU determines a "NO" answer to return the program to step 42 through steps 43m, 49 and 50 as described above. When the main control program proceeds to step 43e during generation of the set signal from switch 17, the CPU determines a "YES" answer due to previous set of the flag $F_{ON}$ and proceeds to program to step 42 through steps 43L, 43m, 49 and 50. When the program proceeds to step 43d after disappearance of the set signal, the CPU determines a "NO" answer and acts at 43f to reset to flag $F_{ON}$ so as to return the program step 42 as described above.

When the vehicle door is closed so as to close the door switch 19 and the setting switch 17 is closed again, the CPU determines a "YES" answer at step 43d due to a set signal from switch 17 and successively determines a "NO" answer at step 43e due to previous set of the flag $F_{ON}$ at step 43f. Thus, the CPU acts to set the flag $F_{ON}$ at step 43g and determines a "NO" answer at step 43h in response to the previous reset of the flag $F_s$ at step 41. When the program proceeds to step 43j through step 43h the CPU determines a "YES" answer due to the high voltage $H_l$ from regulator relay 15, the set signal from setting switch 17 and disappearance of the door signal, and it acts to set the flag $F_s$ at a step 43k. Then, the CPU determines a "YES" answer at step 43L due to the set of flag $F_s$ at step 43k and acts at a step 43n to produce an output signal for activating the setting lamp La and maintaining it in its lit condition. As a result, the operator can confirm with his eye the fact that the flag $F_s$ has been set to effect the automatic start and stop control of the engine, and he will release the setting switch 17 to its open position.

Successively, the main control program proceeds from step 43n to a step 44 in FIG. 2 where the CPU acts to reset the flag $F_1$ so as to determine at the following step 45 whether the flag $F_1$ is reset or not. In this embodiment, the flag $F_1$ is adapted to represent the fact that the level of speed pulses from sensor 16 changes. Then the CPU determines "YES" answer at step 45 due to previous reset of the flag $F_1$ at step 44 returns the program to step 42. Subsequently, the CPU determines a "NO" answer at step 42 in response to a previous setting of the flag $F_s$ at step 43k and proceeds to a step 51 for determining a condition for cancelling of the setting condition. In this embodiment, the cancel condition is arranged to be satisfied by either generation of the door signal from switch 19 or generation of the set signal from setting switch 17 under setting of the flag $F_s$. Thus, the CPU determines a "NO" answer at step 51 due to lack of both the door and set signals, and the control program returns to step 42 through step 45. In addition, the flag $F_s$ is reset at step 43i if CPU determines as "YES" answer at step 43h of the discrimination routine.

When the vehicle is started to travel along a road, the actual travelling speed of the vehicle is detected by speed sensor 16 sequentially as a speed pulse which is applied to the computer 20. If, at this stage, the predetermined period of time for interruption lapses, the CPU acts to cease the execution of the main control program and to initiate the execution of the interruption control program at a step 60 in FIG. 4. At a step 61, CPU acts to store the speed pulses from sensor 16 in RAM and to proceed in the interruption control program to the following step 62 for determining the level of speed pulses. In case the level of speed pulses stored in the RAM is high, the CPU determines a "YES" answer at step 62 and proceeds in the program to a step 64 to determine the level of flag $F_2$. At this stage, CPU discriminates as "NO" answer because of the flag $F_2=0$ at step 41 and proceeds in the program to a step 66 to set the flag $F_2=1$. When the program proceeds to the following step 67 through step 66, the CPU acts to reset a count data C of a counter in RAM and subsequently acts at a step 68 to set the flag $F_1$ so as to end the execution of the interruption control program at a final step 72. In this embodiment, the counter in RAM is responsive to the clock signals from the clock circuit to count a lapse of time while the speed pulses are maintained at the same level. Alternatively, if the CPU determines a "NO" answer at the prior step 62, the program will proceed to a step 63 where the CPU determines whether the flag $F_2=0$.

After the execution of such interruption control program, the main control program proceeds to its step 45 where the CPU determines a "NO" answer because of the setting of flag $F_1$ at the prior step 68. Thus, the CPU proceeds the control program to the following step 46 to determine whether or not the vehicle engine is stopped. At step 46, the CPU determines a "NO" answer during generation of the high level voltage $H_i$ from regulator relay 15 causing the control program to a step 52 so as to go to determine a condition for a stopping of the engine. In this embodiment, the condition for stopping of the engine is as follows: a second clutch signal from the second clutch switch 18b disappears and simultaneously the count data C by the counter in the RAM indicates a predetermined lapse of time, for instance 2 seconds, which is required for temporarily stopping the vehicle after depression of a brake pedal of the vehicle. If the predetermined lapse of time is not indicated by the count data C, the CPU determines a "NO" answer at step 52 to return the control program to step 42.

When the interruption control program is subsequently executed by the CPU as described above, the speed pulses from sensor 16 are stored in the RAM at step 16. Assuming that at this stage the level of the speed pulses is low, the CPU determines a "NO" answer at step 62 and the program proceeds to step 63 to determine whether the flag $F_2$ is zero or not. As a result, the CPU determines a "NO" answer because of the flag $F_2=1$ at step 66 in the previous execution, and it acts to set the flag $F_2=0$ at the following step 65. Thereafter, the CPU acts to reset the count data C at step 67 and to set the flag $F_1$ at step 68 so as to end the execution of the interruption control program. When the main control program proceeds to step 45 after the execution described above, the CPU determines a "NO" answer thereby determining a "NO" answer respectively at steps 46 and 52. Alternatively, if the answer at step 62 is "YES" during the execution of the interruption control program, the CPU determines a "YES" answer at step 64 because of the flag $F_2=1$ in the previous execution, and the program proceeds to a step 69 for updating the count data C in the RAM. From the above description, it will be understood that the engine rotation during travel of the vehicle is maintained under control of the computer 20 in dependence upon a change of the level of speed pulses from sensor 16.

When the brake pedal is depressed to temporarily stop the vehicle, for instance at a street crossing, the second clutch switch 18b is opened by a full depression of the clutch pedal prior to stopping the vehicle to generate a second clutch signal therefrom during the execution of the control programs respectively through the steps 42, 51, 45, 46 and 52 and through the steps 65 (66) and 68. After stopping the vehicle, the second clutch signal from switch 18b disappears in dependence upon release of the clutch pedal, and the speed sensor 16 produces a low level signal therefrom if the reed-switch 16b of sensor 16 is closed by magnetic coupling with disk 16a. Under such condition, the low level from sensor 16 is memorized in the RAM at step 61 during successive execution of the interruption control program, and the CPU determines a "NO" answer at step 62 and the program proceeds to step 63. At this stage, the CPU determines a "YES" answer at step 63 because of the flag $F_2=0$ in the previous execution, and the program proceeds to the following step 69 to set the count data $C=1$. When the program proceeds to a step 70 through step 69, the CPU discriminates whether or not 2 seconds have elapsed after reset of the count data C at step 67. If the answer to this question is "NO", the control program will end at step 72.

When the main control program proceeds to step 52 after the above execution of the interruption control program, the CPU determines a "NO" answer in dependence upon the count data $C=1$ at the prior step 70 to return the program to the step 42. During successive execution of the control programs, the CPU determines a "NO" answer at steps 52 and 70 until 2 seconds elapse after reset of the count data C at step 67. Upon a lapse of 2 seconds after reset of the count data C, the CPU determines a "YES" answer at step 70 to set the count data $C=2$ seconds at the following step 71 and subsequently determines a "YES" answer at step 52 and the main control program proceeds to a step 53. Thus, the computer 20 produces an output signal for stopping the engine, and the transistor 33 is turned on in response to the output signal from computer 20 to energize the ignition relay 34 so as to open the normally closed contact 34b. As a result, the supply of electric current to ignition coil 12c is interrupted to stop the engine, and the regulator relay 15 generates a low level voltage $L_o$ therefrom.

When the main control program proceeds to step 46 through steps 49, 50, 42 during stop of the engine, the CPU determines a "YES" answer and the program proceeds to the following step 47 so as to determine whether a condition for activation of the starter motor 11 is satisfied or not. In this embodiment, the condition for activation of the starter motor 11 is arranged to be satisfied by the presence of a low level voltage $L_o$ from regulator relay 15 and a first clutch signal from first clutch switch 18a. Under release of the clutch pedal during a stopping of the engine, the first clutch switch 18a does not produce any first clutch signal. As a result, determines a "NO" answer at step 47 and subsequently determines a "NO" answer at step 49 to return the program to step 42.

If the reed-switch 16b of sensor 16 is in its open position during arrest a stopping of the vehicle, the speed sensor 16 produces a high level signal therefrom. Under such condition, the high level signal from sensor 16 is memorized in the RAM at step 61 during successive execution of the interruption control program, and the CPU determines a "YES" answer at step 62 causing the program to proceed to step 64. Then, the CPU determines a "NO" answer at step 64 because of the flag $F_2=0$ in the previous execution and subsequently acts to set the flag $F_2=1$ at step 66 so as to cause the program to proceed to step 72 through steps 67 and 68. When the interruption control program returns to step 64, the CPU determines a "YES" answer because of the flag $F_2=1$ in the previous execution and causes the program to proceed to step 69 so as to update the count data $C=C+1$. Thereafter, the CPU determines a "NO" answer at steps 70 and 52 until 2 seconds elapse after reset of the count data C at step 67, as previously described. Upon a lapse of 2 seconds after reset of the count data C, the CPU determines a "YES" answer at step 70 and subsequently determines a "YES" answer at step 52 causing the main control program to proceed to step 53. Thus, the computer 20 produces an output signal for stopping the engine as described above.

When the clutch pedal is depressed to restart the vehicle, the first clutch switch 18a is closed to generate a first clutch signal therefrom, and in turn, the CPU determines a "YES" answer at step 47 during successive executions of the main control program due to the low level voltage $L_o$ from regulator relay 15 and the first clutch signal from switch 18a. This means that the condition for activation of the starter motor 11 has been satisfied. As a result, the CPU acts to produce an output signal for activating the starter motor 11 at the following step 48. Responsive to the output signal from the computer, the transistor 31 is turned on to energize the starter relay 32, and the normally open contact 32b of relay 32 is closed to allow supply of the electric current to the starter motor 11 from the power source 10. Thus, the starter motor 11 is activated by the supply of electric current to start the engine, and the regulator relay 15 cooperates with the alternator 14 to generate a high level voltage $H_i$ therefrom. Under such condition, the CPU determines a "YES" answer at step 49 and subsequently determines a "YES" answer at step 50 to generate an output signal for deactivating the starter motor 11. As a result, the transistor 31 is turned off in response to the output signal from the computer 20 to deenergize the starter relay 32, and the contact 32b of relay 32 opens to block the supply of electric current to the starter motor 11. Thus, the starter motor 11 is deactivated, and the vehicle is conditioned to restart under the automatic start and stop control of the engine.

If the vehicle door is opened during each transient arrest of the vehicle as described above, the door switch 19 is closed to generate a door signal therefrom. Under this condition, the CPU determines a "YES" answer at step 51 due to the door signal from switch 19 and acts to reset the flag $F_s$ at the following step 54. Subsequently, the CPU acts to generate a deactivating signal at step 55 and to generate an activating signal at step 56. This means that the setting condition for the automatic start and stop control of the engine has been canceled. Thus, the transistor 31 is turned off in response to the deactivating signal from the computer 20 to maintain the contact 32b of relay 32 in its open position so as to disable automatic activation of the starter motor 11, while the transistor 33 is turned off in response to the activating signal from the computer 20 to maintain the contact 34b of ignition relay 34 in its closed position so as to allow supply of the electric current to the ignition coil 12c from the power source 10. After cancelling the setting condition for automatic control, the engine is conditioned to start only by operation of the ignition switch 13.

When the main control program returns to step 42 through steps 54, 55 and 56, CPU determines a "YES" answer due to previous reset of the flag $F_s$ at step 54 causing the program to proceed to the discrimination routine of FIG. 3. At step 43a, the CPU determines a "NO" answer due to prior reset of the flag $F_{sw}$ at step 43c and the program proceeds to step 43d to determine the presence of the set signal from setting switch 17. Subsequently, the CPU determines a "NO" answer at step 43d due to lack of the set signal, and the program proceeds to step 43f where the CPU acts to reset the flag $F_{ON}$. When the program proceeds to step 43L through step 43f, the CPU determines a "NO" answer and acts at step 43m to produce an output signal for extinguishing the setting lamp La and maintaining it in its deactivated condition. As a result of such extinguishment of the setting lamp La, the operator can confirm the cancelling of the automatic control by his observation of the lamp.

In operation of the above embodiment, it is presumable that prior to operation of the ignition switch 13 the input port of computer 20 may be grounded due to damage of the setting switch 17, disconnection of the wiring between the setting switch 17 and computer 20 or the like. Under such unexpected condition, the computer 20 is applied with a low level signal caused by ground of its input port in operation of the ignition switch 13. This means that the computer 20 is applied with a set signal under inoperative condition of the setting switch 17 to effect the automatic start and stop control of the engine without any intention of the operator.

Assuming that under such unexpected condition as described above, the CPU of computer 20 acts at step 41 of the main control program to initialize the computer, to reset the flag $F_s$ and to set the flags $F_2$, $F_{sw}$, the program proceeds to step 42 where the CPU determines a "YES" answer resulting in the program proceeding to the discrimination routine 43 of FIG. 3. Thus, the CPU determines a "YES" answer at step 43a due to previous set of the flag $F_{sw}$ at step 41 causing the program to proceed to step 43b. In this instance, the CPU determines a "YES" answer at step 43b due to a set signal in the form of the low level signal caused by a grounding of the input port of computer 20, and the program returns to step 42. Thereafter, execution of the program through steps 42, 43a and 43b is repeated to render the following execution of the programs ineffective, and the setting lamp La is maintained in its extinguished condition. This eliminates an unexpected automatic start and stop control of the engine which would otherwise be caused by error in operation of the setting switch 17. From the above description, it is to be noted that the automatic start and stop control of the engine is effected only when the setting switch 17 is intentionally operated by the operator after operation of the ignition switch 13. It is also noted that under such condition as described above, the start of the engine is effected by operation of the ignition switch 13, and the engine rotation is maintained in a usual manner.

Alternatively, if the input port of computer 20 is grounded due to error in operation of the setting switch 17 after operation of the ignition switch 13, the CPU of computer 20 determines a "NO" answer at step 43a due to previous reset of the flag $F_{sw}$ at step 43c and the program proceeds to step 43d to determine the presence of the set signal from setting switch 17. In this instance, the CPU determines a "YES" answer at step 43d due to a set signal in the form of the low level signal caused by a ground of the input port of computer 20, and the program proceeds to step 43j through steps 43e, 43g and 43h as previously described above. Thus, CPU determines a "YES" answer at step 43j to set the flag $F_s$ at step 43k. Then, the CPU determines a "YES" answer at step 43L due to the set of flag $F_s$ and acts at step 43n to produce an output signal for activating the setting lamp La and maintaining it in its lit condition. As a result, the light of setting lamp La serves as a warning signal to inform the operator of the fact that the flag $F_s$ has been set to effect the automatic start and stop control of the engine.

Although the above embodiment has been adapted to gasoline engines, the present invention may be adapted to a Diesel engine. In such application of the present invention, the ignition circuit 12 is replaced with a fuel injection control device for the engine which is arranged under control of the ignition relay 34.

Having thus described the preferred embodiment of the invention it should be understood that numerous structural modifications and adaptations may be resorted to without departing from the spirit of the invention.

What is claimed is:

1. A control system for controlling the automatic stopping and restarting of a vehicle prime mover having a main switch associated therewith comprising:
    user actuable setting means for providing a set signal for enabling automatic control; and
    computer means, operable when said main switch is closed and responsive to said set signal including (a) means for stopping said prime mover when said vehicle stops, (b) means for restarting said prime mover upon the occurrence of a predetermined condition, (c) means for maintaining the operation of said prime mover until the vehicle stops, (d) means for detecting whether said setting signal occurs after said main switch is closed and if so, performing the function of means (a)-(c) and if not, preventing theperformance of the functions of means (a)-(c).

2. A control system according to claim 1 wherein said computer means further comprises (e) means for generating an operation signal indicative of an enablement of the functions of means (a)-(c), said control system further comprising an indicator response to said operation signal for indicating to a user that said functions of means (a)-(c) are enabled.

3. A control system according to claim 1, further comprising door switch means cooperable with a vehicle door for generating a door signal when the vehicle door is opened, said computer means further including means for preventing ocomputer the performance of the functions of means (a)-(c) when said door signal is present.

4. A control system for controlling the operation of a vehicle prime mover having a starting control circuit which in its activated condition connects an electric power source to a starter of said vehicle and in its deactivated condition disconnects said starter from said power source, a drive control circuit which in its activated condition maintains the operative condition of said prime mover and in its deactivated condition automatically renders the prime mover inoperative, a main switch which in its actuated position connects said power source to said drive control circuit, and a mechanism for effecting movement of the vehicle, said control system comprising:
    an electric control device for activating said starter control circuit in response to operation of said movement mechanism and for deactivating said starter control circuit inresponse to operation of the prime mover, said electric circuit control device further including means for maintaining said drive control circuit in its activated condition while the vehicle is moving and for deactivating said drive control circuit when the vehicle stops; and
    setting means for generating a set signal;
    said electric control device further including means for detecting whether said setting signal occurs after said main switch is actuated and if not, disabling said electric control device and means for generating a signal for indicating an operational condition of said drive control circuit and an indicator responsive to said indicating signal for indicating said condition to a user.

5. An automatic control system for controlling the operation of a vehicle prime mover having a main switch associated therewith, comprising:
    a prime mover control element;
    setting means for generating a setting signal;
    detection means for detecting whether the setting signal occurs after a closure of said main switch;
    maintenance means for maintaining operation said control element when said setting signal occurs after closure of said main switch; and
    disabling means for disabling operation of said control element when said setting signal does not occur after closure of said main switch.

* * * * *